United States Patent [19]
Kojima

[11] Patent Number: 5,754,021
[45] Date of Patent: May 19, 1998

[54] LOAD CONTROL SYSTEM FOR VEHICLE

[75] Inventor: Naoya Kojima, Shizuoka, Japan

[73] Assignee: Yazaki Corporation, Tokyo, Japan

[21] Appl. No.: 687,923

[22] Filed: Jul. 26, 1996

[30] Foreign Application Priority Data

Aug. 2, 1995 [JP] Japan ............... 7-197611

[51] Int. Cl.⁶ ............... H04Q 9/00; H02J 1/00
[52] U.S. Cl. ............... 318/466; 318/34; 307/9; 307/10.1
[58] Field of Search ............... 318/30–89, 139, 318/560–696; 307/9–12

[56] References Cited

U.S. PATENT DOCUMENTS

| | | | |
|---|---|---|---|
| 4,538,262 | 8/1985 | Sinniger et al. | 307/10.1 |
| 4,578,591 | 3/1986 | Floyd et al. | 307/10.1 |
| 4,594,571 | 6/1986 | Neuhaus et al. | 307/10.1 |
| 4,639,609 | 1/1987 | Floyd et al. | 307/10.1 |
| 4,706,194 | 11/1987 | Webb et al. | 318/466 |
| 4,845,708 | 7/1989 | Herrmann, Jr. et al. | 307/10.1 |
| 4,883,974 | 11/1989 | Tinder | 307/10.1 |
| 4,887,263 | 12/1989 | Steely | 307/10.1 |
| 4,907,222 | 3/1990 | Slavik | 307/10.1 |
| 4,942,571 | 7/1990 | Moller et al. | 307/10.1 |
| 5,289,043 | 2/1994 | Marshall et al. | 307/38 |
| 5,313,104 | 5/1994 | Shibata et al. | 307/10.1 |
| 5,406,171 | 4/1995 | Moody | 307/10.8 |
| 5,406,270 | 4/1995 | Van Lente | 307/10.1 |
| 5,483,517 | 1/1996 | Kurata et al. | 307/10.1 |
| 5,508,689 | 4/1996 | Rado et al. | 340/825.06 |
| 5,621,250 | 4/1997 | Kim | 307/10.1 |
| 5,623,169 | 4/1997 | Sugimoto et al. | 307/10.1 |

FOREIGN PATENT DOCUMENTS

| | | | |
|---|---|---|---|
| 50-27932 | 3/1975 | Japan | H02J 13/00 |

*Primary Examiner*—Paul IP
*Attorney, Agent, or Firm*—Sughrue, Mion, Zinn, Macpeak & Seas, PLLC

[57] ABSTRACT

An improved load control system for controlling loads such as electric motors in a vehicle is disclosed. The system includes switching circuits, each associated with particular loads and placed in close proximity to the loads' respective switches. The system also includes several load control units which are placed in various locations inside the car, so as to minimize the possibility that all the control units will be damaged in a collision. Each of the switching circuits is capable of sending commands to each of the control units, and each of the control units is capable of controlling each of the loads in the car. Thus, when a failure occurs in a particular switching circuit, the associated loads can be controlled using another switching circuit.

9 Claims, 2 Drawing Sheets

LOAD CONTROL SYSTEM FOR VEHICLE

BACKGROUND OF THE INVENTION

1. Technical Field of the Invention

The present invention relates to a load controller for vehicles having electric loads such as various kinds of motors, lamps, and so on and, more particularly, it relates to an improvement in a load control system for vehicles in which a plurality of load controllers for the vehicle are connected to each other through a transmission medium.

2. Description of Related Art

Generally, vehicles such as cars or the like are equipped with various kinds of electric loads such as motors and light bulbs. The motors are used, for example, for opening/closing windows in power window systems or to operate the windshield wipers. With the introduction of microprocessors into vehicles, various load control systems have been developed to control the power these loads are consuming. In addition, various switching circuits relaying operational instructions to the respective electrical loads have been developed and are generally provided in concealed locations such as, for example, inside the doors or inside the dashboard. A communication line and a load control circuit are interposed between the electric loads and the switching circuits. Thus, the modern power distribution system comprises electric loads, switching circuits, communication line and a load control circuit.

To operate a particular load, operation instruction information from the switching circuits is supplied to the load control circuit through the communication line. In response, the load control circuit controls the load on the basis of the operation instruction information. For example, when a window switch is operated to open a window, the instruction information is supplied to the load control circuit through the communication line, so that the load control circuit may control the drive of the motor to open the window.

Heretofore, a technique concerning the load control system was disclosed, for example, in JP-A-50-27932, in which a plurality of load controllers are provided separately in the cabin of the vehicle and connected to each other through a transmission medium such as an electric wire cable, or the like.

As shown in FIG. 2, the conventional load control system is configured so that terminal processing units (TPU) 104, 105, 107, 109 and 111 are connected to a central processing unit (CPU) 103, provided in a vehicle 101, through signal lines 113, 115 and 117, respectively. The terminal processing units 104 and 105 are provided in the front portion of the vehicle 101 to control the drive of electric loads such as head lamps, or the like, attached to the front portion of the vehicle. On the other hand, the terminal processing units 109 and 111 are provided in the rear portion of the vehicle 101 to control the drive of electric loads such as brake lamps, or the like, attached to the rear portion of the vehicle. The terminal processing unit 107 is provided in the vicinity of the driver's seat to input operation instruction information through various switches provided in the neighborhood of the driver's seat so as to control, for example, the drive of a window opening/closing motor in a power window apparatus on the basis of the thus input operation instruction information. Upon reception of the operation instruction information from the various kinds of switches through the terminal processing unit 107, the central processing unit 103 supplies a drive control signal to one of the terminal processing units 104, 105, 109 or 111, which corresponds to the particular load to be controlled. Upon reception of the drive control signal, the corresponding terminal processing unit performs the drive control of the electric load on the basis of the drive control signal thus received.

Such an aforementioned conventional load control system has a problem caused by the fact that the function of inputting operation instruction information from various kinds of switches and the function of outputting drive control signals to perform the drive control of various kinds of electric loads are concentrated into the terminal processing unit 107. This arrangement presents the risk that a failure in the unit 107 would cause both input and output functions to be lost simultaneously. If such a failure occurs, none of the functions normally controlled via the TPU 107 cannot be performed.

It should be realized that in addition for the inconvenience that such a failure may cause, such a situation may also present a safety hazard. For example, TPU 107 may also control the function of the power lock and remote hatch opening (such as remote opening of the rear door of a van). Therefore, in case of emergency, such as in an accident, it is imperative that the occupants will be able to unlock the doors and open the rear hatch. However, if the TPU 107 has been damaged during the accident, the occupants may be unable to unlock the doors, especially if the doors were also damaged and cannot be unlocked manually.

To solve this problem, researches have been seeking to develop a load control system in which at least the output function can be retained even in the case where a certain failure occurs in the terminal processing unit 107.

The present invention has been achieved in view of the aforementioned problems in the prior art system, and an object of the present invention is to provide a load control system for a vehicle in which the function of input operation instruction information from various kinds of switches and the function of output drive control signals to perform the drive control of various kinds of electric loads are allocated to separate units individually so that at least the output function can be preserve in the case of a system failure.

SUMMARY OF THE PRESENT INVENTION

To solve the aforementioned problem, according to a first aspect of the present invention, the load control system comprises electric loads provided in the vehicle and a plurality of information input means including operation switches respectively provided in various places, such as the doors and seats, in the car. Upon activation by the user, the switches send signals to relate operation instructions to perform drive control of the electric loads. Switching circuits are provided to relay the signals from the switches to one of the plurality of drive control units. Several drive control units are provided in different locations in the car and are commonly connected via, for example, a data bus. All the control units are connected to all the switching circuits, so that the operation instruction information supplied from one switching circuit can be used to control the operation of any load unit in the car.

According to an aspect of the present invention, the operation instruction information from one of the operation switches is first supplied to a respective switching circuit. The operation instruction information is in turn supplied to a control unit and is shared by all of the other drive control units. Then, one of the drive control units supplies a drive control signal to the corresponding electric load to perform the drive control of the electric load on the basis of the commonly shared operation instruction information. In this respect, each of the switching circuits can provide information to operate all of the loads in the vehicle, and each of the load control units is capable of controlling any of the loads.

That is, the operation instruction information input function is allocated to the various switching circuits, while the drive control signal output function is allocated to the various drive control units. Accordingly, even in the case where the information input function of one of the switching circuits is lost due to a breakdown, or the like, the operation instruction information can be supplied to the drive control units through a different switching circuit.

DETAILED DESCRIPTION OF THE PREFERRED EMBODIMENTS

An embodiment of the load control system for a vehicle according to the present invention will be described below in detail with reference to the drawings.

Figure 1:
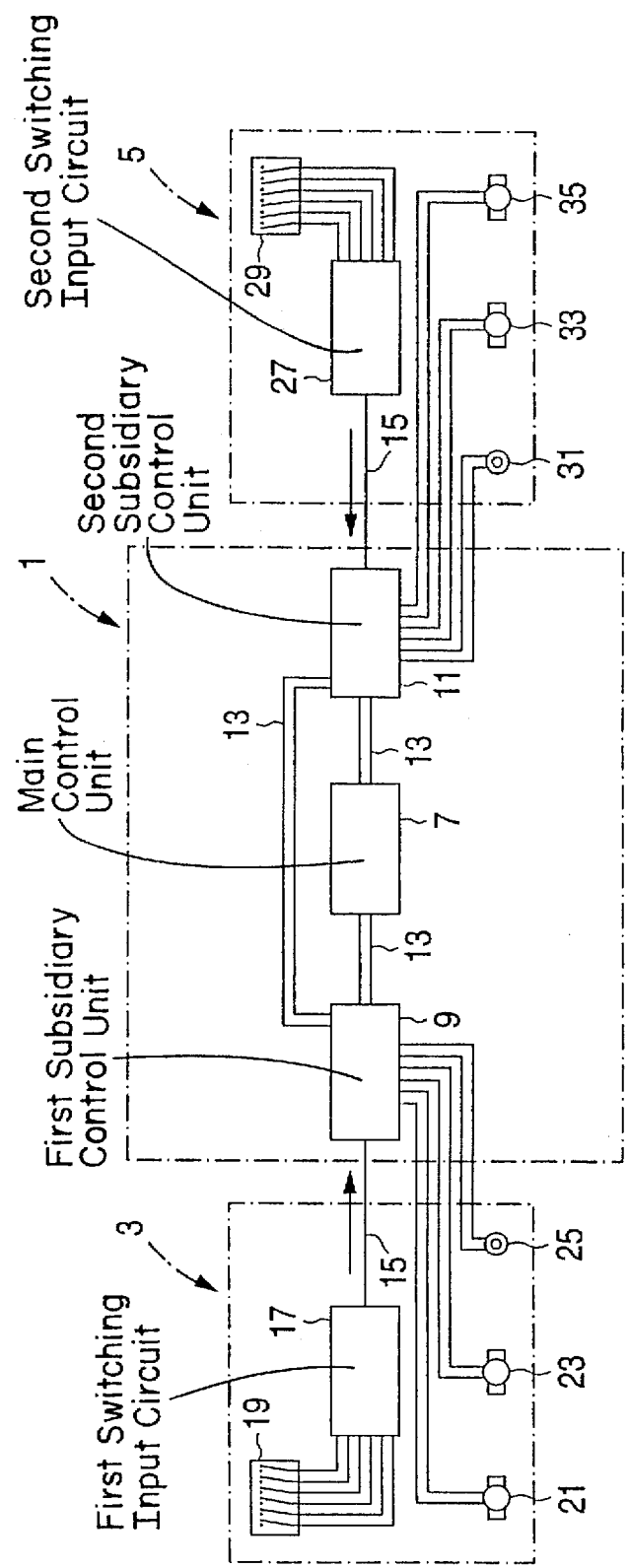
FIG. 1 is a block diagram showing a load control system for a vehicle according to the present invention.
Figure 2:
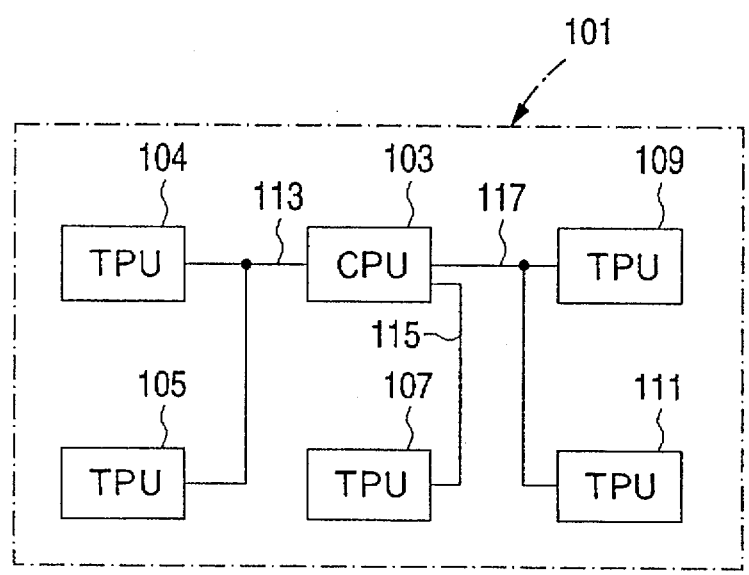
FIG. 2 is a block diagram showing a conventional load control system for a vehicle.

FIG. 1 is a block diagram showing a load control system for a vehicle according to the present invention. In this embodiment, the vehicle will be exemplified by a car, and the electric loads equipped in the vehicle will be exemplified by a window opening/closing motor, a door lock motor and a step lamp.

As shown in FIG. 1, the load control system is constituted by a load control block 1 and first and second information supply blocks 3 and 5. The load control block 1, provided with three load control units connected to each other through electric wire cables, uses various information in common to the three control units and output drive control signals to electric loads in accordance with the information. The first and second information supply blocks 3 and 5 are provided with various kinds of electric loads driven in accordance with the drive control signals output from the load control block 1 and are designed to receive operation instruction information from various kinds of switches and supply the information to the load control block 1. That is, each of the first and second information supply blocks 3 and 5 functions to receive operation instruction information from the various kinds of switches, while the load control block 1 functions to output the drive control signals to the electric loads according to the information supplied from the first and second information supply blocks 3 and 5.

In the aforementioned configuration of the load control system according to the present invention, the operation instruction information input function and the drive control signal output function are allocated to the separate function blocks provided separately so that the separate function blocks have exclusive functions. Accordingly, for example, even in the case where the information input function of the first information supply block 3 is lost because of a breakdown, or the like, the second information supply block 5 can act in place of the first information supply block 3 to thereby supply operation instruction information to the load control block 1. Therefore, the lost function of the first information supply block 3 is compensated by the block 5. Accordingly, the problem associated with the conventional load control system in which one load controller has both the input function and the drive control signal output function, so that upon a breakdown both functions can be lost, is solved by the present invention by distributing the input and output functions to various units.

In the preferred embodiment the load control block 1 is configured so that one main control unit 7 and two, first and second, subsidiary control units 9 and 11 are connected to each other through electric wire cables 13. Depending on design constrains, such as cost and complexity, any or all of the load control units 7, 9, and 11, can be implemented by a microprocessor.

The electric wire cables 13 function as transmission media for connecting the three control units 7, 9 and 11, and may be replaced by other suitable transmission media, such as fiber-optic cables, or the like. In the preferred embodiment the transmission path connecting the three control units 7, 9 and 11, is formed as a ring, but any suitable link such as a bus, a tree structure, a star configuration, or the like, may be used. The method of accessing the transmission medium in each control unit, that is, the media access control method, may be any suitable method such as a CSMA (carrier sense multiple access), a CSMA/CD (carrier sense multiple access/collision detect), a token ring, or the like.

Furthermore, it is to be understood that the number of control units is not limited to three which are shown by way of example in this embodiment. To the contrary, a suitable number of control units may be provided depending on the complexity of the system and the numbers of loads to be controlled. The data transmission method can be any suitable method such as a time division multiplexing, or the like. In short, use of any transmission form is permitted as long as the plurality of control units are connected through a suitable transmission path so that vehicle information can be shared between the control units.

In the preferred embodiment the control units 7, 9 and 11 of the load control block 1 are distributed in suitable locations inside the car's cabin. The locations are selected so as to minimize the risk of damage in the case of a collision. For example, the main control unit 7 can be placed inside the instrument panel and the first and second subsidiary control units 9 and 11 can be provided in an empty space under the front passenger seat or driver's seat, or one under each. Safe placement of the control units can avoid potential loss of the drive control signal output function in a collision.

The first and second information supply blocks 3 and 5 have first and second switch groups 19 and 29 constituted by various kinds of switches. The first and second switching input circuits 17 and 27 receive operation instruction information from the first and second switch groups 19 and 29 and relay the information to the first and second subsidiary control units 9 and 11 of the load control block (shared information block) 1 through communication lines 15. A group of various electric loads 21, 23 and 25, and a group of various electric loads 31, 33 and 35 are normally driven on the basis of drive control signals supplied from the first and second subsidiary control units 9 and 11 of the load control block 1, respectively. However, as will be described later, each of the loads 21, 23,25, 31, 33, and 35 can be driven by either of units 9 and 11.

Now, a particular example will be provided to facilitate proper understanding of the preferred embodiment of the present invention. According to this example, information supply block 3 corresponds to functions associated with the front passenger-side door and the information supply block 5 corresponds to functions associated with the driver-side door. Thus, in this example, the instrumentation associated with information supply block 3 is provided in the passenger-side door, while the instrumentation associated with the information supply block 5 is provided in the driver-side door.

In the above example, the first and second switch groups 19 and 29 include, for example, power window switches, power window lock switches for locking the operation of the windows, power door lock switches, normally-closed door switches for detecting the opening/closing of the doors, and so on. The various electric loads 21, 23, 25, 31, 33 and 35, include, for example, motors 21 and 35 for opening/closing the door windows, door lock motors 23 and 33, step lamps 25 and 31, and so on. The first and second switching input circuits 17 and 27 can be formed simply, for example, by using multiplexers, or the like, because their function is merely to relay the signals from the first and second switch groups 19 and 29 to the first and second subsidiary control units 9 and 11 of the load control block 1 through communication lines 15, respectively. Accordingly, sensitive and expensive circuits such as a CPU, a signal multiplexing circuit, and so on, can be omitted from the first and second switching input circuits 17 and 27, to gain reduction in size, weight and cost while improving the reliability and integrity of the system.

As noted above, the first and second switch groups 19 and 29, the first and second switching input circuits 17 and 27 and the respective groups of various electric loads 21, 23 and 25, and 31, 33 and 35, which make up the first and second information supply blocks 3 and 5 respectively, are provided in the passenger-side door and the driver-side door, respectively. That is, the elements associated with the first and second information supply blocks 3 and 5 are provided adjacently to the controlled objects, such as the window, the door lock, etc., to thereby minimize the required length of electric wire for the connections between the first and second in formation supply blocks 3 and 5 and the controlled objects.

The operation of the load control system according to the above example will be described below.

When, for example, a passenger activates a switch to lower its window, the first switching group 19 sends a signal to the first switch input circuit 17 indicating an instruction to move down the passenger-side window. Then, the signal is sent to the first subsidiary control unit 9 of the load control block 1 through the communication line 15. Upon reception of this signal, the first subsidiary control unit 9 supplies a control signal to the motor 21, indicating an instruction to move down the passenger-side window.

On the other hand, assume that a collision occurred and that the information supply block 3 has been damaged so that no signal can be sent to the load control block 1. Such a situation can occur when either or both of the switch group 19 and the switch input circuit 17 are damaged. Thus, if the operation instruction information input function of the first switch group 19 or first switching input circuit 17 is lost, the passenger cannot open the window or unlock the door using the power system. Normally, such a situation may merely present an inconvenience. However, if the passenger is also unable to lower the window or unlock the door manually, such a situation may present a safety hazard as well.

Unlike the conventional systems, the load control system of the present invention will remain operable to control all of the loads even if an input device is damaged in a collision. That is, since according to the present invention any input signal is commonly shared by the control units 7, 9 and 11, as long as a command is received by one of control units 9 and 11, the desired function can be implemented. Therefore, when information supply block 3 is damaged, the input signal can be provided from the information supply block 5, and any of the loads 21, 23 and 25 can be operated using commands supplied from information supply block 5. This feature will be explained with continued reference to the above example of the passenger and driver sides doors.

The explanation of the feature will be provided assuming that either of switch group 19 or the switching input circuit 17 has been damaged and that it is desired to lower the passenger-side window. In this case, the signal to move down the window can be provided to the second switching input circuit 27, which would supply the signal to the second subsidiary control unit 11 through the communication line 15. The second subsidiary control unit 11 supplies this information to the first subsidiary control unit 9 through the electric wire cable 13. Upon reception of this signal, the first subsidiary control unit 9 supplies a control signal to the opening/closing motor 21, indicating an instruction to lower the window.

As described above, the load control system according to the present invention is designed so that the operation instruction information input function and the drive control signal output function are allocated to separate function blocks. Accordingly, even in the case where the information input function, for example, of the first information supply block 3 is lost due to a breakdown thereof, or the like, the lost information input function of the first information supply block 3 can be compensated by the operation instruction information function of the second information supply block 5.

Furthermore, the switch circuits 17 and 27, constituting part of the information input means, are simplified so that the risk of failure is minimized. This way, the switching circuits can be placed locally to the switches 19 and 29, so as to reduce the length of wiring required to connect each switch to the corresponding switching circuit. For example, since switches associated with functions of the door are normally provided on the door panel, the corresponding switching circuit can be provided inside the door, and the risk of failure due to environmental conditions or a collision are minimized by the simplification of the circuit.

On the other hand, each of the load control units 7, 9 and 11 can be placed in different locations inside the vehicle, so that the possibility of all of them being damaged in a collision is minimized. Thus, even if one of the load control units is damaged in a collision, the control signals can be provided by another unit.

Although the present invention have been described with reference to preferred embodiments and examples thereof, those skilled in the art would appreciate that various modifications, additions and substitutions are possible without departing from the scope and spirit of the invention as recited in the accompanying claims.

What is claimed is:

1. A load control system for controlling a plurality of loads provided in a vehicle comprising:

a plurality of load control units provided inside said vehicle and having electrical connection therebetween, each of said load control units further connected to at least one of said the loads;

a plurality of switches, each corresponding to one of said the loads;

a plurality of switching circuits, each connected to at least one of said load control units and relaying signals received from a subset of said plurality of switches to said at least one of said load control units;

wherein each of said load control units is responsive to signals received from one of said switching circuits connected thereto to control operations of loads connected thereto, and wherein each of said load control units is further responsive to signals received from one of said switching circuits connected thereto to relay control information to another one of said load control units to control operation of loads connected to said another one of said load control units.

2. The load control system for controlling a plurality of loads provided in a vehicle according to claim 1, further comprising a main load control unit interconnected to said plurality of load control units.

3. The load control system for controlling a plurality of loads provided in a vehicle according to claim 2, wherein one of said switching circuits is provided inside a driver-side door of the vehicle, and another of said switching circuits is provided in a front passenger-side door of the vehicle.

4. The load control system for controlling a plurality of loads provided in a vehicle according to claim 3, wherein said loads comprise a plurality of power window motors and a plurality of power lock motors.

5. A load control system for controlling a first set of loads and a second set of loads provided in a vehicle, comprising:
a first and a second load control units provided inside said vehicle and having electrical connection therebetween, said first load control unit being connected to the first set of loads and said second load control unit being connected to the second set of loads;
a first set of switches provided in spatial close proximity to the first set of loads;
a second set of switches provided in spatial close proximity to the second set of loads;
first switching circuit connected between said first set of switches and said first load control unit, and relaying signals received from said first set of switches to said first load control unit;
second switching circuit connected between said second set of switches and said second load control unit, and relaying signals received from said second set of switches to said second load control unit;
wherein said first load control unit is responsive to signals received from said first switching circuit to control operations of the first set of loads and further responsive to signals received from said first switching circuit to relay control information to said second load control unit to control operation of the second set of loads; and,
wherein said second load control unit is responsive to signals received from said second switching circuit to control operations of the second set of loads and further responsive to signals received from said second switching circuit to relay control information to said first load control unit to control operation of the first set of loads.

6. The load control system for controlling a first set of loads and a second set of loads provided in a vehicle according to claim 5, further comprising a main load control unit interconnected to said first and second load control units.

7. The load control system for controlling a first set of loads and a second set of loads provided in a vehicle according to claim 6, wherein said first switching circuit is provided inside a driver-side door of the vehicle, and said second switching circuit is provided in a front passenger-side door of the vehicle.

8. The load control system for controlling a first set of loads and a second set of loads provided in a vehicle according to claim 7, wherein the first set of loads comprises a power window motor and a power lock motor provided inside said driver-side door, and wherein the second set of loads comprises a power window motor and a power lock motor provided inside said front passenger-side door.

9. A load control system for controlling a first set of loads and a second set of loads provided in a vehicle, comprising:
a first and a second load control units provided inside said vehicle and having electrical connection therebetween, said first load control unit being connected to the first set of loads and said second load control unit being connected to the second set of loads;
a first set of switches provided in spatial close proximity to the first set of loads;
a second set of switches provided in spatial close proximity to the second set of loads;
first switching circuit connected between said first set of switches and said first load control unit, and relaying signals received from said first set of switches to said first load control unit;
second switching circuit connected between said second set of switches and said second load control unit, and relaying signals received from said second set of switches to said second load control unit;
wherein said first load control unit comprises a microprocessor preprogrammed to output control signals to the first set of loads to control operations of the first set of loads in response to signals received from said first switching circuit, and further preprogrammed to relay control information to said second load control unit to control operation of the second set of loads in response to signals received from said first switching circuit; and
wherein said second load control unit comprises a microprocessor preprogrammed to output control signals to the second set of loads to control operations of the second set of loads in response to signals received from said second switching circuit, and further preprogrammed to relay control information to said first load control unit to control operation of the first set of loads in response to signals received from said second switching circuit.

* * * * *